Jan. 11, 1938. A. T. LEVY 2,104,870
BUILDING
Filed Dec. 14, 1935 6 Sheets-Sheet 2
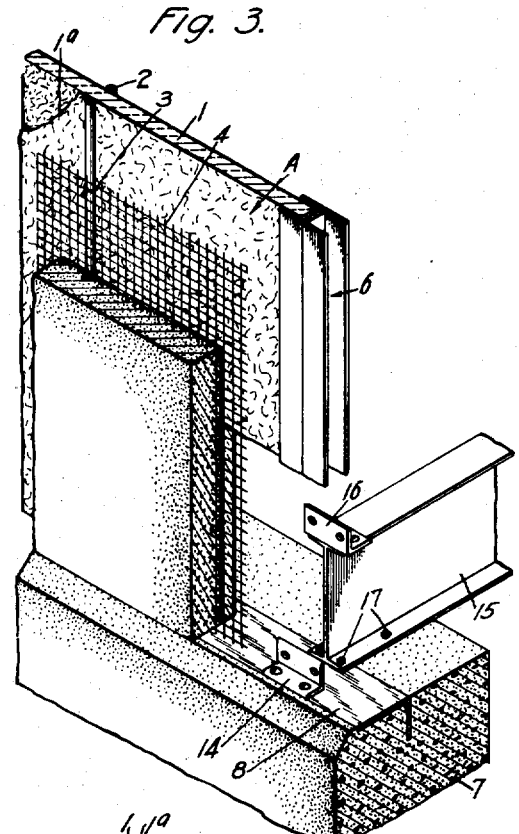
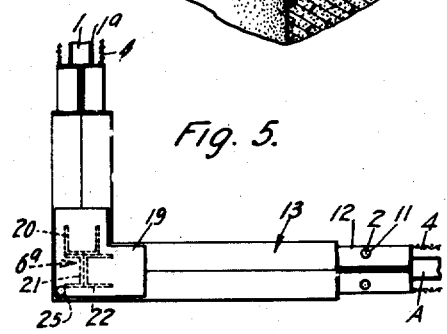
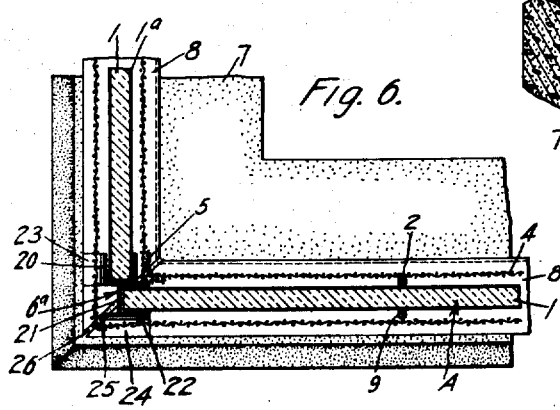
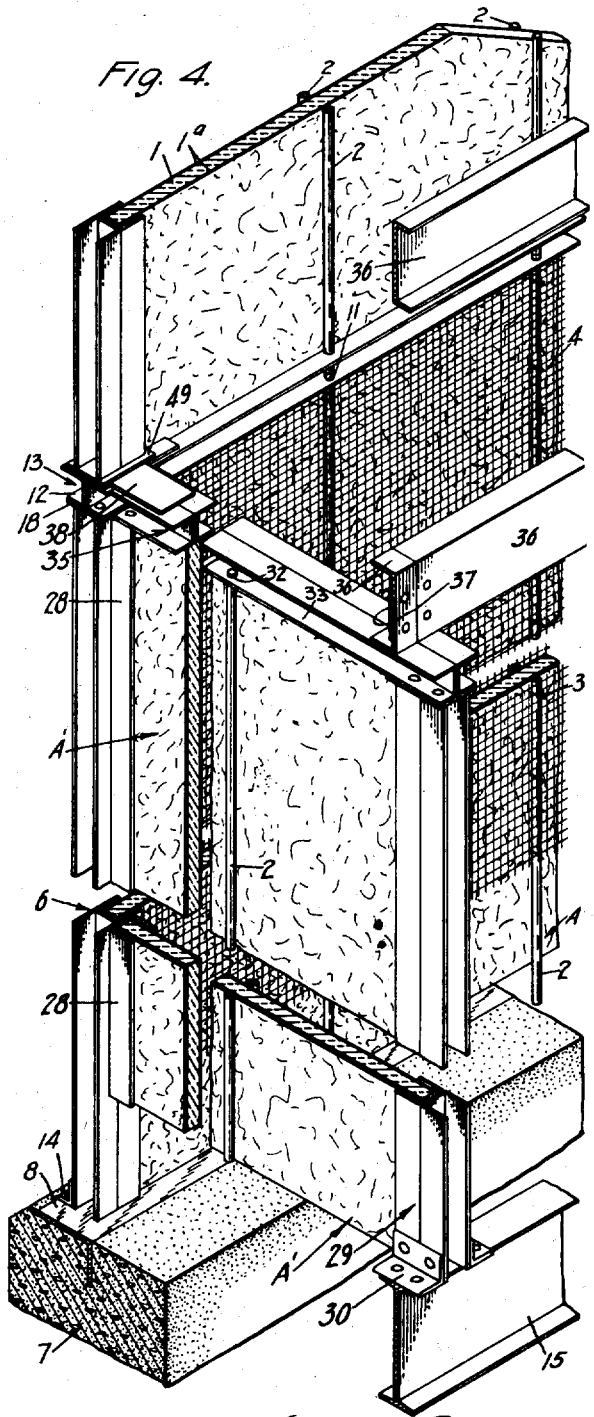
INVENTOR
Austin T. Levy
By
ATTORNEY

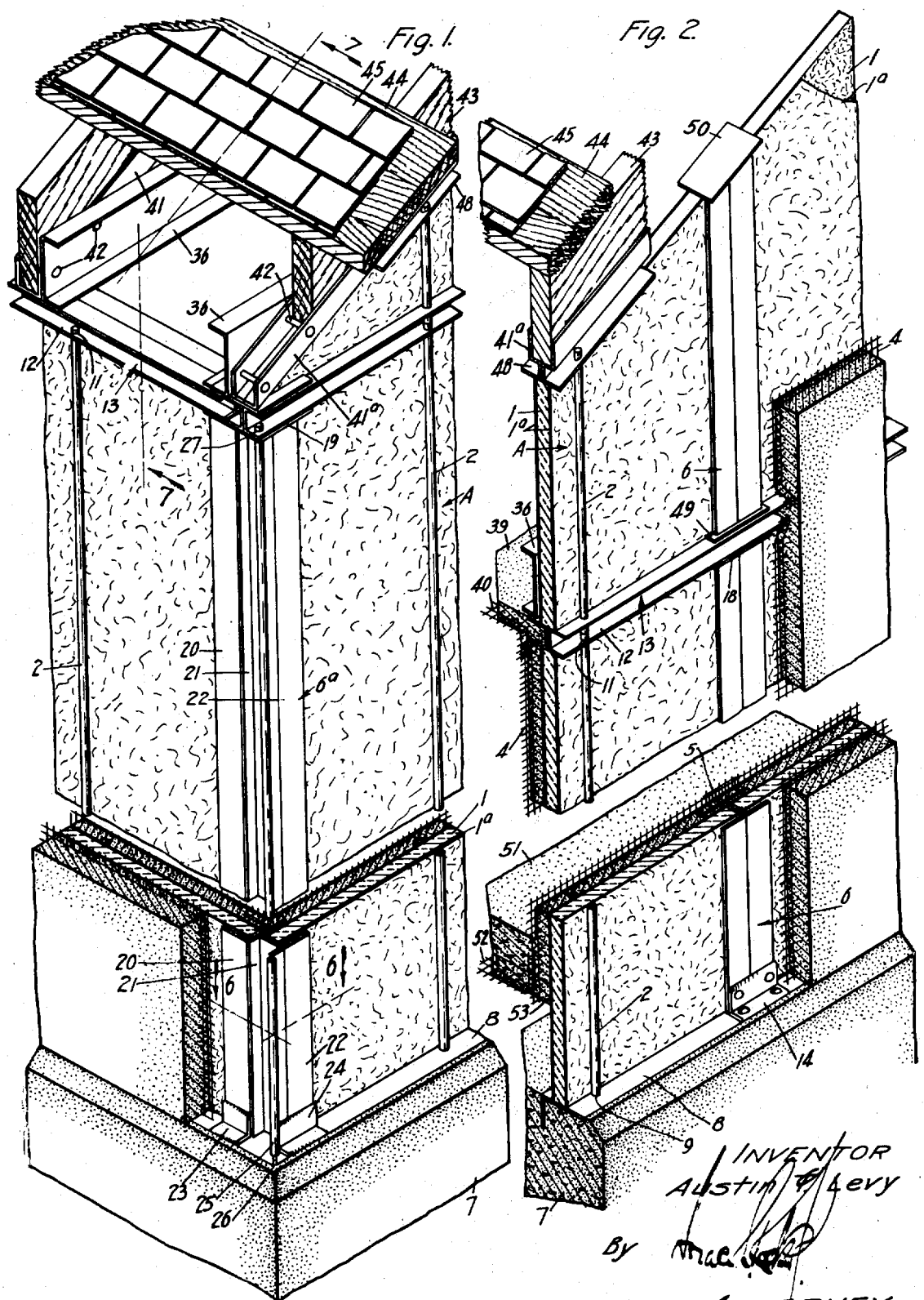

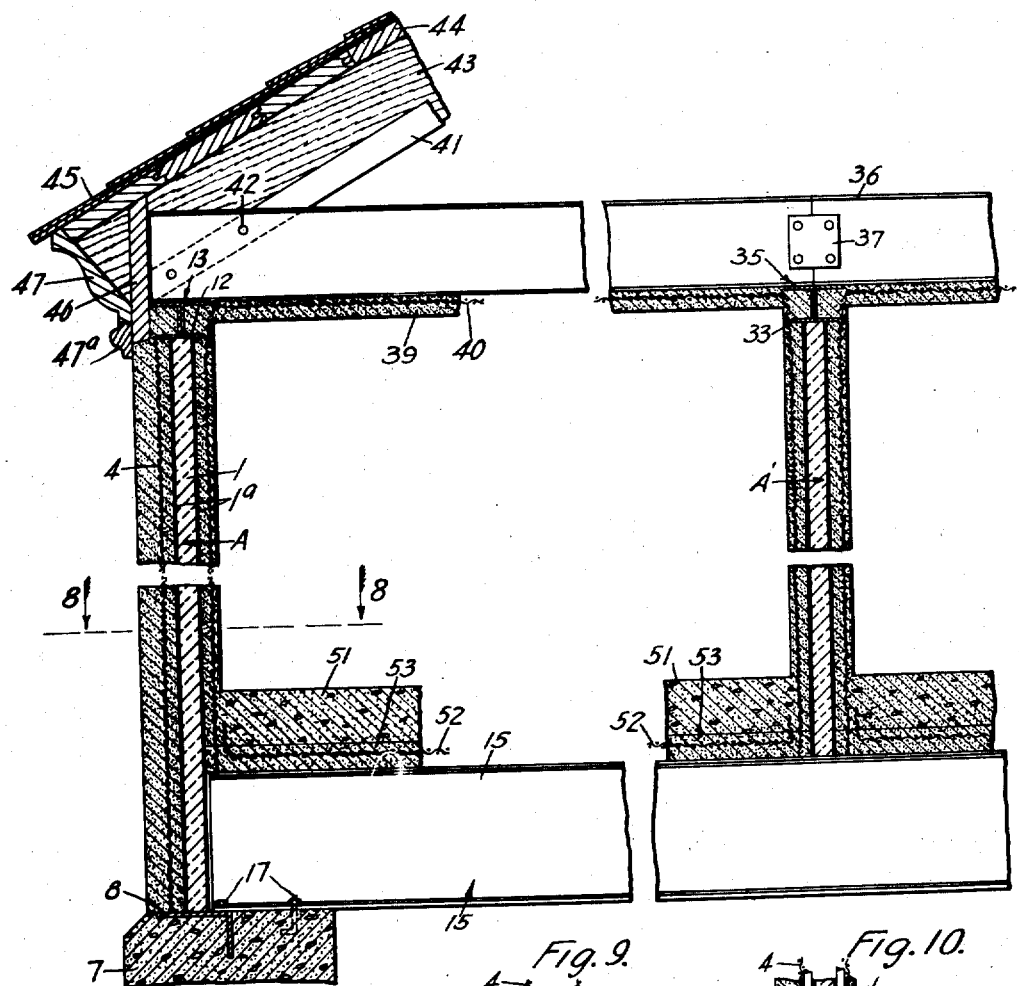

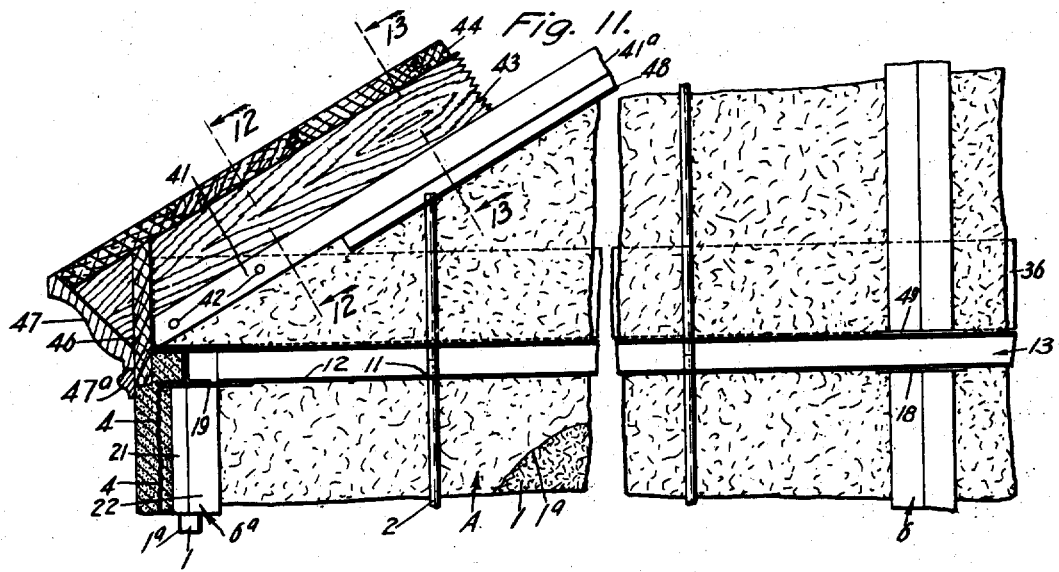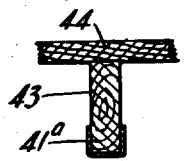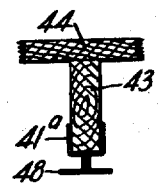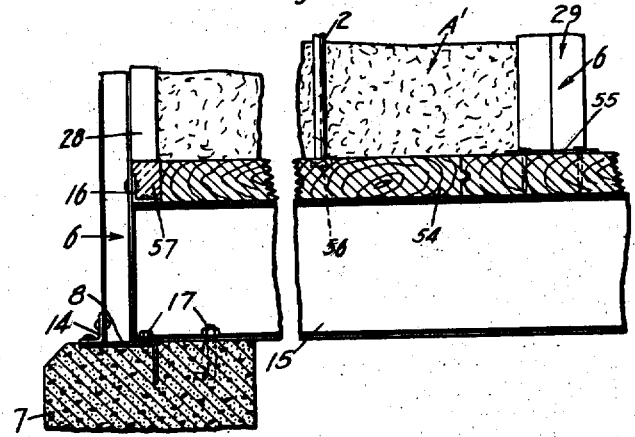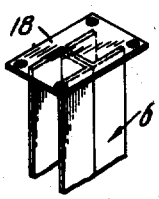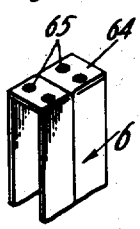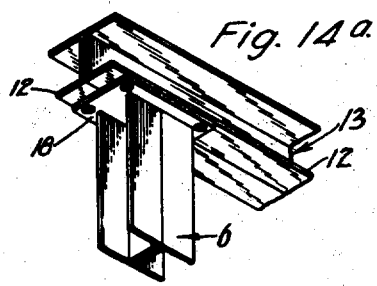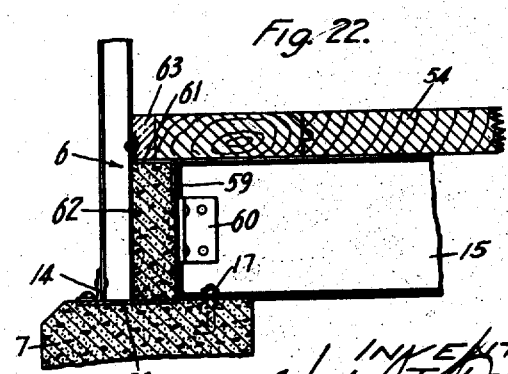

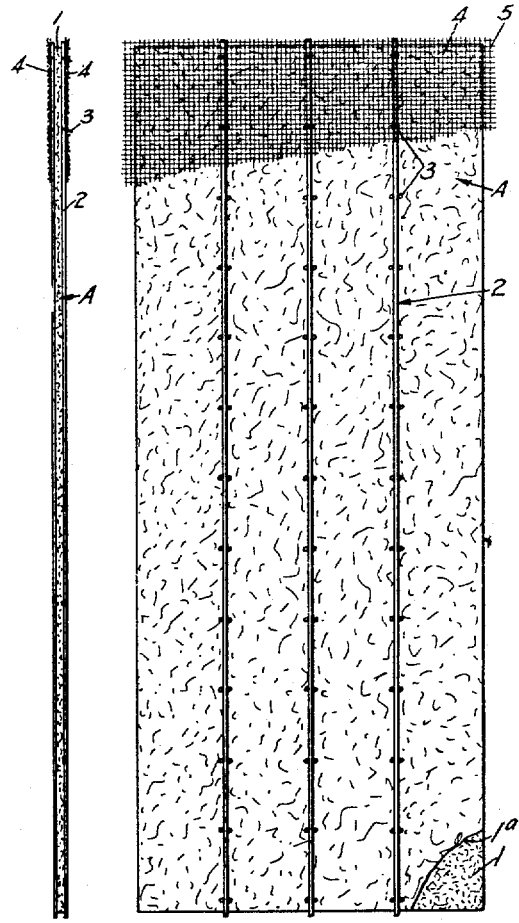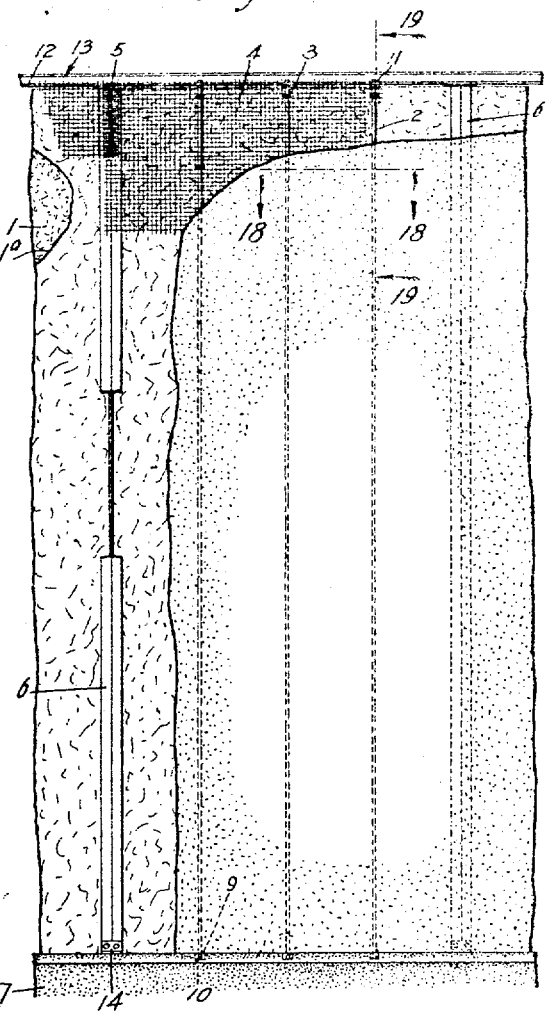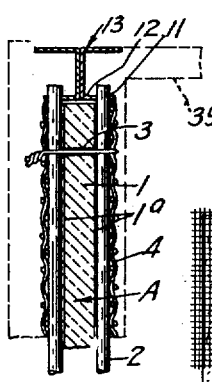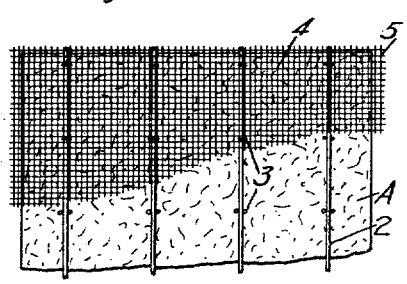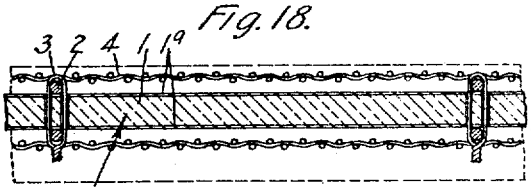

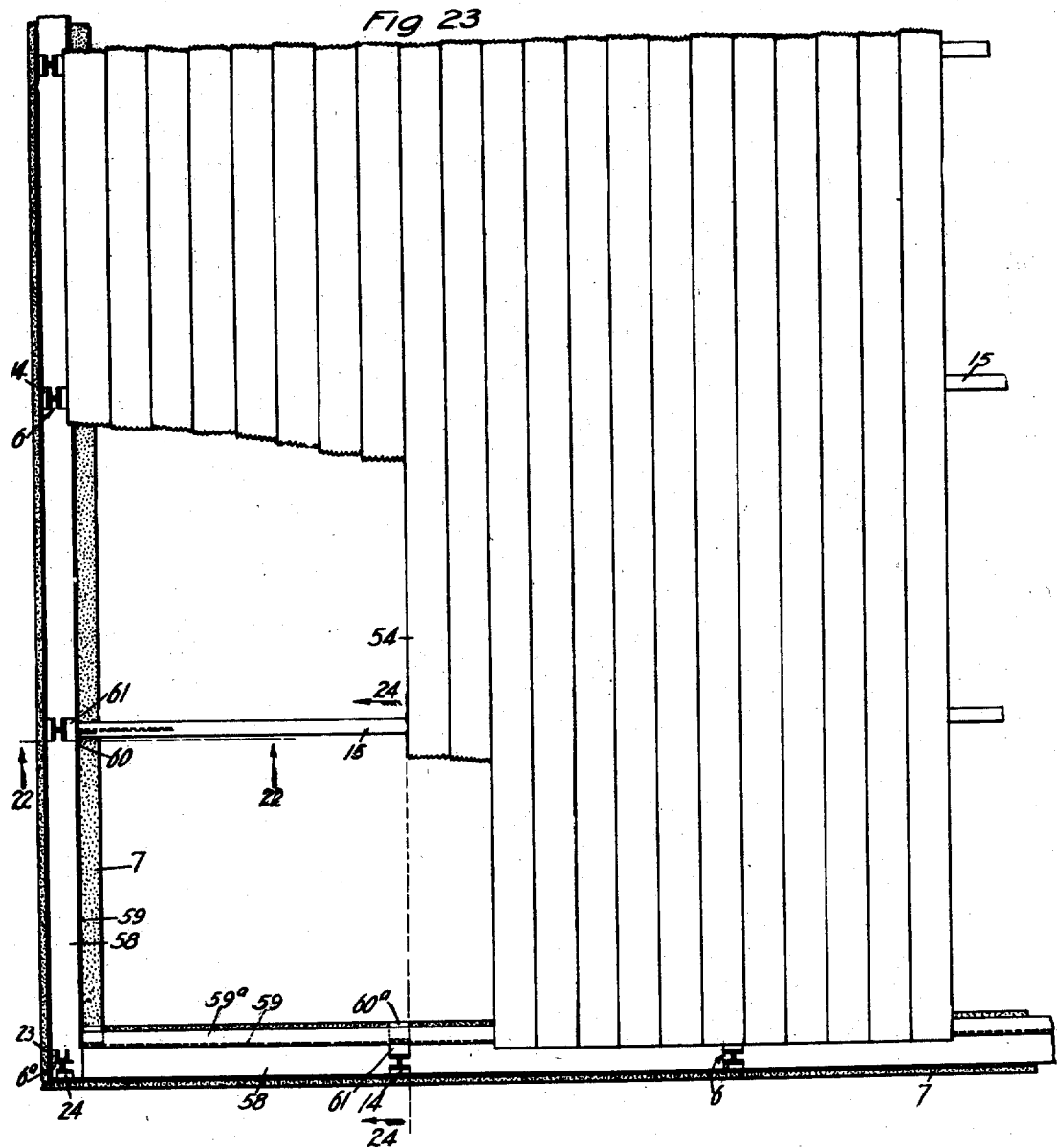
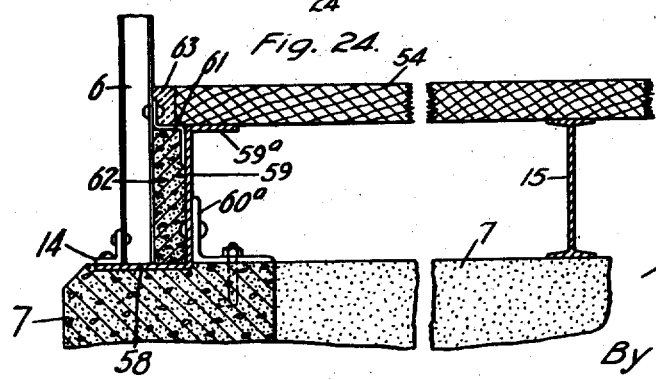

Patented Jan. 11, 1938

2,104,870

UNITED STATES PATENT OFFICE 2,104,870

BUILDING

Austin T. Levy, Harrisville, R. I.

Application December 14, 1935, Serial No. 54,429

29 Claims. (Cl. 72—1)

My invention relates to buildings.

It has among its objects to provide an improved prefabricated building of the general type described and claimed in my copending application, Serial No. 46,156, filed October 22, 1935. A further object is to provide improved and simplified supporting and connecting means for prefabricated wall forming units of the construction described and claimed in that application. Another object includes the provision of an improved building frame particularly adapted to cooperate with such units, while being of an improved simplified and rigid construction making possible the elimination of top and bottom unit receiving channels heretofore provided. Still further objects of my invention are to provide such a frame having improved supporting and attaching connections to the foundation, as well as improved corner construction and improved plate, gable end and roof supporting structures, all whereby the structure is materially simplified and improved and especially adapted to use with my improved units. These and other objects and advantages of my improved construction will, however, hereinafter more fully appear.

In the accompanying drawings, I have shown for purposes of illustration certain embodiments which my invention may assume in practice.

In these drawings,—

Figure 1 is a perspective view of a corner of a building constructed in accordance with my improvements, certain portions of the outside stucco and of the units, frame, and roof structure being broken away to facilitate illustration;

Fig. 2 is a like perspective view showing the gable end at the right in Fig. 1 at a point further along to the right;

Fig. 3 is a detail showing the means for connecting one of the upright unit or panel channels to one of the floor beams;

Fig. 4 is a view from inside the house looking out and showing one of the partitions and its mounting on a floor beam together with the ceiling structure above the partition;

Fig. 5 is a detail plan view of the corner construction shown in Fig. 1, the view being taken above the corner stud and plate;

Fig. 6 is a sectional view on line 6—6 of Fig. 1;

Fig. 7 is a sectional view of the building and a partition therein, the view being taken on line 7—7 of Fig. 1;

Fig. 8 is a detail section on line 8—8 of Fig. 7;

Fig. 9 is a like detail section on line 9—9 of Fig. 8;

Fig. 10 is a detail section on line 10—10 of Fig. 8;

Fig. 11 is an end elevation of the gable end shown in Fig. 1 prior to the application of stucco thereto;

Fig. 12 is a detail section on line 12—12 of Fig. 11;

Fig. 13 is a like section on line 13—13 of Fig. 11;

Fig. 14 is a detail perspective view of an intermediate stud and plate connecting means carried thereby;

Fig. 14a is an enlarged perspective view of such a stud and plate structure;

Fig. 15 is a side elevation of one of the panel units on a reduced scale;

Fig. 15a is a detail view similar to Fig. 15 and showing a modified spacing arrangement of the reenforcing rods;

Fig. 16 is an end elevation of the unit shown in Fig. 15;

Fig. 17 is a side elevation of such a unit when assembled in the wall panel and covered with stucco, portions of the latter being broken away to facilitate illustration;

Fig. 18 is a detail sectional view on line 18—18 of Fig. 17;

Fig. 19 is a detail sectional view on line 19—19 of Fig. 17;

Fig. 20 is a perspective view of a modified form of the plate structure shown in Fig. 14;

Fig. 21 is a sectional view of a modified wooden floor supporting structure;

Fig. 22 shows a sectional view of a further modified form of wooden floor construction, the section being taken on line 22—22 of Fig. 23;

Fig. 23 is a detail plan view of the metal work at the corner of building of the construction shown in Fig. 22, and Fig. 24 is a sectional view on line 24—24 of Fig. 23.

Referring first to the structure shown in Figs. 1 to 19, it will be noted that I have shown therein my invention applied for illustrative purposes to a single-story house of the general type described in my above mentioned application, and also utilizing prefabricated wall forming units, generally indicated at A, of the construction shown in that application; these units herein being supported and connected in an improved manner in an improved frame as hereinafter described, prior to the application of the inner and outer cementitious coatings of stucco and plaster.

These units A, as illustrated in Figs. 15 and 16, are of the same construction described and claimed in my application mentioned so that a detailed description thereof is unnecessary. It will however be noted that each includes an inner panel or board 1 of suitable thermal insulating material such, for example, as the compressed wood fiber commercially known as "Insulite", with or without suitable insulating or building paper 1a on the faces thereof and having a series of parallel steel reenforcing rods 2 suitably connected thereto at 3 and disposed in spaced relation on opposite faces of the board while projecting beyond the upper and lower edges thereof. These rods 2 may be equally spaced as shown in Fig. 15 but, preferably, are arranged as shown in Fig. 15a, an extra rod being provided while preserving the same relative spacing between rods, the same then being so disposed that the rods nearest the side edges of the units are closer to the edges than to the other rods. Thus it is made possible to provide uniform spacing between rods throughout the entire wall and strengthen the panel while making possible a better spacing of the coating anchoring material from the panels particularly over the studs. Here also, as heretofore, the connections 3 also serve to connect outer reenforcing sheets of metal wire or expanded metal lath 4 disposed outside the rods 2 on opposite faces of the board 1 and preferably extending laterally beyond the edges of the board as indicated at 5. Thus, it will be evident that each unit A is adapted to clinch both the outer stucco and inner plaster as previously described.

In my improved construction, however, it will be noted that, while the units A have their vertical or side edges received in vertical double channel or stud members 6, here also preferably formed by welding single channels back to back as described in my application mentioned, improved mounting and connecting means are provided for the units at the top and bottom thereof, as a result of which it is made possible to eliminate the bottom and top channels of my prior construction. Referring first to the improved means at the bottom of the units, it will be observed that I herein provide on the concrete foundation wall 7 an angle plate 8 which has one flange embedded in and flush with the top of the wall 7 and the other embedded vertically in the wall. This plate at suitable points along the same is provided with apertures 9 adapted to receive the lower ends of the unit rods 2 which herein project through these apertures 9 and also preferably into like substantially registering apertures 10 provided in the wall 7 beneath the apertures 9. Further, referring to the top connections of the units, which herein form the walls of the house, it will be observed that the protruding upper ends of the unit rods 2 similarly project into apertures 11 in lateral flanges 12 on a horizontally disposed member, generally indicated at 13. It will thus be evident that through the interconnection of the rods 2 at their lower and upper ends, the units A will be securely located in position.

Attention is further directed to the improved connections provided herein for supporting and connecting the lower ends of the metal studs 6. Here, it will be noted that the lower end of each of these welded studs is attached to the plate 8 by an angle plate 14 of substantially the width of the stud, and having one upright arm suitably attached to the latter and the other suitably fixed to the top of the plate 8. Moreover, it will be noted that where a stud 6 is opposite the end of one of the floor supporting angle beams 15, the beam and stud are connected by a plate 16 similar to plate 14. It will also be noted that the beam herein is suitably connected to both the plate 8 and the foundation wall 7 through holding bolts 17 suitably embedded in the wall. Thus, it will be observed that a very rigid and simple frame and beam structure is provided.

Attention is further directed to the improved plate structure to which the upper ends of these studs 6 are connected. Referring more particularly to the plate, it will be noted that the members 13 are generally similar to the studs 6 but horizontally disposed and comprise oppositely disposed channel members connected back to back as by welding. Further, under each of these members 13 and above the upper end of each stud 6, a plate 18 is provided which is suitably attached, as by welding, to the upper end of the stud 6, and also suitably attached to the lower flanges 12 on the plate member 13. Thus, with a plate comprising members 13 extending along the walls of the building and with the several studs 6 connected thereto by their rods 2 engaging in the apertures 11 in the flanges 12 on the plate member, it will be evident that the several units or panels A will be securely positioned ready for the application of their inner and outer cementitious coats.

The above described plate structure is also of improved construction at its corners, as shown in Figs. 1 and 5. Referring to Fig. 1, it will be noted that one member 13, herein for example that which extends along the gable end, is extended beyond the end of the other member 13, which herein extends along the building side, with the members at right angles as shown at the left in Fig. 1. Further, as shown in that figure and Fig. 5, a right angle plate 19 is disposed beneath the adjacent ends of both members 13 and above a corner stud 6a hereinafter described. As a result, with the plate 19 suitably fixed to the corner stud 6a and to the adjacent extremities of the members 13 as, for example, by welding, it will be evident that the side and end walls will be securely held together at the corners.

Referring more particularly to the corner stud 6a, it will be observed that the same is of the general type described as a modification in my above mentioned application. More particularly, it includes three channels 20, 21 and 22 suitably connected, and herein preferably welded together, to form a unit. Of these, the channel 21 is of less depth than the rest and disposed back to back with the channel 22, while the channel 20 is disposed at the side of the channels 21 and 22 with its outer wall substantially flush with the edges of the channel 21. Attention here is further directed to the fact that this corner stud 6a is held in position at the bottom by improved means similar to those used herein to position the studs 6 and including angle plates 23 and 24 similar to the angle plate 14. Of these, the plate 23 applied to the outer face of channel 20 attaches said channel to the plate 8, while the plate 24 applied to the outer faces of channels 21 and 22 attaches said channels to the plate 8. Thus, with the united channels forming the corner stud 6a and the latter stud rigidly connected at its bottom to the foundation and also welded at its top to the plate member 19, a very strong corner construction is provided.

Here, it will also be observed that additional corner means are provided herein which are adapted to cooperate with the reenforcing wire or lath 4 on the adjacent corner units A to provide a corner support for the stucco. These means include a steel corner rod 25 extending vertically herein at the corner of the metal unit carrying frame. As shown, the lower end of this rod is seated in a suitable aperture in the foundation 7, preferably in a slot 26 between adjacent diagonally cut ends of adjacent members 8, while the upper end of the rod extends through suitable registering apertures 27 in the plate 19 and the adjacent bottom flange of the plate member 13. By reason of this structure, it will be observed that not only is the corner structure strengthened, but that it is made possible for the outer reenforcing mesh or lath 4 to be extended at the edges of the adjacent corner units A in such manner as to engage or overlie, or be attached to, the corner rod 25 as desired, and thus insure effective clinching of the stucco coating at this corner.

Referring next to the partition structure, it will be observed that, as shown in Fig. 4, a stud 6 is provided with an inwardly directed single channel member 28 welded thereto at the back within the side margins thereof. Further, a partition unit A', generally similar to but preferably more light and thin than the units A, is disposed in this channel member 28 and between the same and a stud member 29, generally similar to the stud 6, and suitably attached at its lower end as by an angle plate or plates 30 to a floor beam 15. Here also, it will be noted that the upper ends of the partition units A' are suitably connected by their rods 2 in apertures 32 in bottom flanges 33 on top members 35, generally similar to the plate members 13. Herein, these members 35 also carry the upper channel joists 36 with adjacent joists suitably interconnected by a plate as at 37. Further, these members 35 have applied to their outer ends, angle plates 38 for connecting them to the members 13. Thus, it will be evident that the partitions will be so securely positioned and connected to the outer frame structure as to cooperate effectively therewith in providing a support for the ceiling and roof structure.

As regards the ceiling structure, note that a ceiling 39 is provided which is suitably supported by the joists 36 heretofore described, of which it will be noted that the joists at the gable ends are reversely disposed relative to the others, as illustrated in Fig. 1. As shown in Fig. 7, the ceiling 39 includes metal lath 40 suitably attached to the joists in any well known manner, as by wiring or the like, and adapted to carry a coating of plaster. If desired, this lath 40 may be bent down at its edges, as illustrated, to facilitate anchoring of the plaster around the margins of the ceiling. Thus, when the walls and partitions are built, and the same, and the ceiling lath 40, are coated with their inner coat of plaster, a satisfactory ceiling is obtained.

Referring next to the roof structure, the joists 36, which, as usual, connect the several plate members 13, herein support angularly disposed channels 41, 41a open at the top and suitably attached to the joists as by bolts 42. These channels, in turn, receive the roof rafters 43, herein suitably attached therein as, for example, by extending the bolts 42 through the rafters as well as the joists and the channels 41. With the channels 41 and rafters 43 connected as usual at their upper ends by any usual ridge connection, a stable roof frame is provided and the joists 36 act as tie members preventing spreading of the channels 41 and rafters 43. As shown, the rafters are connected by roofers 44, herein nailed thereto and carrying any suitable roofing surface such, for example, as shingles 45. Here, it will also be noted that, as shown in Figs. 7 and 11, the roofers may extend over the side of the building and at that point be supported on and attached to a vertical top plate member or ground board 46 enclosing the ends of the joists and fitted between the rafters and preferably disposed flush with the outer surface of the stucco on the outer walls. As shown, a suitable molding 47 is attached to the overhanging edge of the roofers 44 and to the ends of the rafters and also to the member 46 and a further molding 47a covers the joint between the member 46 and the stucco.

I do not claim herein the roof structure illustrated, as the same is claimed in my copending application, Serial No. 173,624, filed November 9, 1937.

Referring next to the gable end structure, this, as shown in Figs. 1, 2 and 11, is likewise formed of units A such as heretofore described, but of such shape as to conform to the shape of the roof. More particularly, at each end of the gable one of these units is substantially triangular in shape so as to fit into the angle adjacent the eaves, while the other units are correspondingly shaped as necessary to form the gable end. As shown, all of these gable end units are in alignment with corresponding units below the same and are similarly anchored in place by their rods 2. As shown in Figs. 1 and 2, the lower ends of the rods 2 of the gable end units are received in suitable apertures in the upper flanges of the underlying members 13, while the upper ends of these rods are received in corresponding flanges 48 formed on the bottoms of the special end channels 41a. As shown in detail in Fig. 13, these flanges are located below the end channels 41a, and the member comprising the channel and the underlying flanges is formed of two pieces welded together. Further, as appears in Figs. 1 and 11, these flanges 48 only extend downward as far as the upper level of the joists 36, any greater length of the same being unnecessary since there are no further rods 2 nearer the corner than the rods shown in Figs. 1 and 11. Attention is further directed to the fact that the corner unit A, shown in Fig. 11 has its right-hand edge received in a stud 6 such as heretofore described, while this stud is suitably connected, as by welding or riveting, to a plate 49 similar to the plate 18 heretofore described, and also connected or welded to the plate member 13 on the opposite side thereof from the plate 18. Also, it will be observed that a similar plate 50, preferably similarly connected to the stud 6, is also suitably connected, as by welding or riveting, to the flanges 48 on the channel 41a.

Referring next to the floor structure, it will be observed that in Figs. 7 to 10 I have illustrated a floor structure 51 of concrete type disposed above the beams 15. As shown, this floor includes a metal reenforcement 52, such as metal lath, supported on the beams 15 and suitably attached thereto, and is formed, as in usual practice, by first providing a brush coat 53 on the lath and thereby creating a form for the upper coat of concrete forming the floor proper. Here, it will also be noted that this metal lath 52 is preferably extended upward along the like metal reenforcement or lath on the inside walls and partitions in such manner that when the floor is poured, the floor and walls are effectually united.

It will be understood that upon the frame comprising the several outside units A and partition units A', cementitious coatings are provided in the form of stucco on the outside walls and plaster on the inside walls. Further, it will be evident that with the metal reenforcement or lath disposed outside the rods 2 and this reenforcement extending over the metal surfaces of the several studs, very effective clinching means are provided for the stucco and plaster. Further, it will be apparent that the metal lath of the units provides an effective connecting means around the corner rods 25 in such manner as, with the channels 6a, to provide a very strong corner structure. Further, it will be evident that both the stucco and the plaster will be received and clinched in the lateral openings in the plate members and in the turned edges of the ceiling and floor lath. Here it will further be understood that, if desired, the metal lath on the units may also be extended above the latter and over these channels, if desired. As a result of the steel frame structure described, which has the units connected thereto, as described, both by their rods 2 and by the disposition of the vertical edges of the unit boards in the channels, it will be evident that a very strong frame will be produced which will be, in effect, integrally united by the external stucco and internal plaster coatings on the inside walls, partitions and ceiling.

In Fig. 21, I have illustrated a wooden floor construction which may be used, if desired. As shown in this figure, boards 54 are laid directly on the beams 15 and anchored thereto by any usual means such as clips, not shown. Further, if desired, non-carrying partitions are also carried on this floor 54, as, for example, by attaching the bottoms of studs 6 directly to the floor, as by nailing lateral extensions 55 on the bottoms of the studs, directly to the floor. Further, as shown in this construction, suitable apertures 56 are provided in the wooden floor 54 to receive the ends of the rods 2, while a stud 28, similar to that previously described, receives one edge of the unit board. Here also, it will be noted that an angle plate 16 is provided beneath the member 28 and secured to the stud 6, which carries that plate, and to the top of the beam 15. Further, in this construction, a space 57 is preferably provided around the edge of the wooden floor to permit expansion of the floor, and this space is herein filled with a suitable insulating material as, for example, rock wool. Here it will also be understood that where desired the extensions 55 may also be suitably attached to a concrete floor.

In Figs. 22, 23 and 24, a further modified wooden floor construction is illustrated wherein the floor 54 is similarly carried directly on the beams 15. In this construction, instead of the plate 8 heretofore described and having a downturned flange extending into the foundation wall 7, an angle plate having flanges 58 and 59 is provided having its upturned flange 59 of the height of the beam 15 and suitably connected thereto, as by an angle plate 60 similar to the angle plate 14. Here also, a further angle plate 61 corresponding in function to the plates 16 heretofore described is provided which is attached to the stud 6 and extends inward therefrom and downward inside the upper edge of the flange 59, where it is attached to the latter, thus providing further lateral support for the studs. Also note that the space enclosed between the parts 58, 59 and 61 is filled with concrete as shown at 62. An expansion space 63 is also preferably provided around the edge of the floor and above the plate 61, and this space also is preferably filled with insulating material such as rock wool.

At the end of the building, a horizontal flange 59a is provided at the top of the flange 59 and this flange 59a has its upper surface flush with the tops of the beams 15. Thus, with this flange 59a extending along the end of the building, it will be observed that a stable support is provided, both vertically and laterally for the ends of the floor boards and that further the studs 6 are laterally supported at a point above their lower ends by the floor supporting structure. As shown in Fig. 24, angle plates 60a support the flange 59 opposite each stud, and angle plates 14 are also provided, as heretofore, to connect the studs 6 to the horizontal portion 58. These plates further cooperate with the floor supporting structure to provide a stable support for the studs 6.

In Fig. 20 I have shown a modified form of stud construction which may be used in connection with the stud 6 in lieu of the plates 18 heretofore described. In this construction, the upper end of each stud is provided with transversely disposed flaps 64. These initially project beyond the ends of the stud and are formed on the abutting portions of the latter and are then bent oppositely laterally, as shown in this figure, so that they overlie and form enclosures at the top of the stud. Further, it will be noted that apertures 65 are provided in these bent over portions 64 so that the studs may thus be suitably attached by bolts to the flanges on the relatively transversely disposed plate members. This construction is, however, not preferred, the use of plates such as 18, 49 and 50 suitably fixed directly to the studs and heretofore described being preferred.

As a result of my improvements, it will be noted that, while continuing to obtain the advantages of my improved prefabricated units described and claimed in my previous application, and while continuing to utilize a light steel frame in which these units are assembled, it is made possible materially to simplify erection and strengthen the frame construction. Further, all necessity for bottom and top channels for the units receiving the top and bottom edges of the boards thereof is eliminated; the rods on the units instead being received in flanges of the improved angle members 8 which are embedded in the concrete, and the upper ends of the rods being received in the flanges in my improved plate members. Further, it will be evident that as a result of such a construction and the use of my improved stud members, and their connections at their lower ends to the plates 8 and the beams, as well as their connections at their upper ends to the plate members, it is made possible to produce an improved frame structure, while also facilitating and expediting erection. Further, it will be noted that, while the bolted connections may be provided, if desired, between the several studs and the plate members, it is also made possible to utilize simple welding operations to a large extent and thereby further to expedite and facilitate the erection of the building frame having the units in assembled relation therein. It will be understood, however, that to connect the various metal parts of the structure, the same may be welded, riveted, or connected by screws of any suitable type, whichever may be preferred, depending upon the particular conditions to be met. It will also be observed that, while continuing to provide a gable end structure and roof structure generally similar to that previously described and formed of my improved units and a channel frame carrying rafters, my improved construction is such as to enable the top and bottom channels receiving the upper and lower ends of the unit boards also to be eliminated from the gable end structure, while also producing a strong and satisfactory construction. These and other advantages of my improvements will, however, be clearly apparent to those skilled in the art.

I do not claim herein the partition structure illustrated, as the same is claimed in my application, Serial No. 161,268, filed August 27, 1937, a continuation of my application, Serial No. 89,960, filed July 10, 1936.

While I have in this application specifically described certain embodiments which my invention may assume in practice, it will be understood that the same are shown for purposes of illustration and that the invention may be modified and embodied in other forms without departing from its spirit or the scope of the appended claims.

What I claim as new and desire to secure by Letters Patent is:

1. In a building, a wall frame including a plate portion, a wall forming panel unit within and supported by said frame having a body extraneous of said portion, and reenforcing means carried by said unit at a face thereof and interlocked with said portion.

2. In a building, a wall frame including studs and an intermediate plate portion having apertures therein, a wall forming panel unit between said studs having a body extraneous of said portion, and reenforcing rods carried by said unit at a face thereof and extending into said apertures.

3. In a building, a wall frame including spaced studs and an upper plate member extending therebetween, and a wall forming panel unit within and supported by said frame between said studs having a body extraneous of said plate member and carrying at a face thereof reenforcing means interlocked with said plate member.

4. In a building, a wall frame including spaced channels and a plate member extending therebetween having a spaced series of apertures therein, and a wall forming panel unit in said channels having a body extraneous of said plate member and carrying on its opposite faces rods seated in different series of apertures.

5. In a building, a foundation wall, a wall frame thereon including spaced studs and a plate member fixed thereto and to said wall above the latter, and a wall forming panel unit between said studs and above said plate member having a body extraneous of the latter carrying at a face thereof external reenforcing rods projecting downwardly into interlocking engagement with said plate member.

6. In a building, a wall frame including spaced studs and an upper plate member extending therebetween, a wall forming panel unit between said studs having a body extraneous of said plate member and beneath the latter, and external reenforcing means on said unit at a face thereof projecting upwardly into interlocking engagement with said plate member.

7. In a prefabricated building, a frame having spaced studs and an upper plate member therebetween including reversely disposed horizontal channels, and a wall forming panel unit disposed beneath said plate member and having a body extraneous of said member and external reenforcing means on its opposite faces interlocked with different horizontal channels.

8. A building structure comprising a corner stud presenting cooperating connected channels disposed at right angles to each other, panels received in said channels, an upright reenforcing rod disposed exteriorly along the corner of said stud, and a coating overlying said panels, stud and rod.

9. A building structure comprising a corner stud having lateral panel receiving channels therein, wall panel units received in said channels and having external coating anchoring sheets thereon extended to overlie said channels, a reenforcing rod at the corner of said stud to which said sheets are extended, and an external coating anchored by said sheets and said rod.

10. In a prefabricated building, a wall frame including a stud comprising channels for receiving the edges of adjacent wall forming panel units, and a plate member overlying the upper end of said stud, and means for connecting said stud to said plate member including a thin pad or plate disposed between said member and the end of said stud and fixed to both of the same, and panel units having lateral edges in said channels and upper edges disposed in part under said pad or plate, said upper edges being extraneous of said plate member.

11. In a prefabricated building, a wall frame including members presenting spaced flat plates forming opposite margins of a panel opening, a wall forming panel unit between said plates, and reenforcing means carried by said unit interlocked with said plates.

12. In a prefabricated building, a wall frame including members presenting spaced flat plates having vertically facing apertures therein and forming opposite margins of a panel opening, a wall forming panel unit between said plates, and reenforcing means carried by said unit comprising reenforcing rods having end portions received in said apertures and interlocked with said plates.

13. In a building, a foundation wall, a plate carried thereon, studs fixed to said plate having receiving vertical channels, wall forming panel units having lateral edges in said channels having and each carrying at a face thereof external reenforcing means including reenforcing rods having portions seated in said plate, and a plate member overlying said units and having said units disposed extraneously thereof and fixed to said studs and interlocked with said rods.

14. In a prefabricated building, a foundation wall, a side wall fixed thereto, floor beams carried on said foundation wall and fixed to said side wall on the inner side of the latter, a wooden floor carried on said beams and laterally spaced from said side wall, and insulating means providing a closure for the space between said floor and side wall while permitting lateral expansion of said floor relative to said side wall.

15. A building comprising a foundation, beams on said foundation, a sill on the foundation at a side thereof parallel to said beams, a plurality of wall studs at the last named side of the foundation supported at their lower ends on said sill, and upstanding means associated with the foundation at the last named side thereof and connected to said studs at points above their lower ends to brace the studs, said upstanding means having a portion extending inward from said studs and providing an inwardly located support.

16. A building comprising a foundation, beams on said foundation, a sill on the foundation at a side thereof parallel to said beams, a plurality of wall studs at the last named side of the foundation connected at their lower ends to said sill, and an upstanding member carried on the foundation inside said sill and connected with said studs at points above the connections of the studs with the sill.

17. In a building structure, a foundation wall, a sill member of angular cross section having a portion fixed on said wall and an upstanding portion, floor supporting beams supported on said wall and fixed to said upstanding portion, studs fixed at spaced points to both portions of said sill member and parallel to said upstanding portion, wall panels in the spaces between the studs, and wall panels in the spaces between the studs carried on the first mentioned portion of said sill and enclosing the second mentioned portion and the ends of said beams.

18. In a building structure, a foundation wall, a sill member of angular cross section having a portion fixed on said wall and an upstanding portion, a lateral flange portion carried on said upstanding portion and disposed oppositely from said first mentioned portion, studs fixed to said first mentioned portion and also fixed to said upstanding portion adjacent said flange and providing lateral support for said flange portion adjacent its upper end, and a floor having its edge carried on said stud supported flange portion.

19. In a building structure, a foundation wall, a sill member of angular cross section having a portion fixed on said wall and an upstanding portion, a lateral flange portion carried on said upstanding portion and disposed oppositely from said first mentioned portion, studs fixed to said first mentioned portion and also fixed to said upstanding portion adjacent said flange and providing lateral support for said flange portion, a floor having its edge carried on said flange portion and supported in spaced relation to said studs while free to expand or contract toward and from the latter, and an angle member disposed under said flange portion and fixing said upstanding portion to said foundation wall.

20. In combination, a foundation wall having angularly related wall portions, angle members extending along said wall portions and each having an upstanding portion, floor supporting beams extending into adjacency and connected to the upstanding portion of one of said angle members and floor supporting, flange means carried at the upper part of the other angle member and parallel to said beams.

21. In combination, a foundation wall having angularly related wall portions, angle members extending along said wall portions and each having an upstanding portion, beams extending into adjacency and connected to the upstanding portion of one of said angle members, flange means formed on the upper part of the other angle member and parallel to said beams, a floor supported on said beams and on said flange means, a side wall upstanding from both portions of said foundation wall in spaced relation with the upstanding portions of said angle members, and a filling of cementitious material occupying the space between the upstanding portions of said angle members and said side wall.

22. In a building, a foundation, beams supported on said foundation and extending to a side of the building, a sill on the foundation at a side thereof parallel to said beams, a plurality of wall studs at the last named side of the foundation connected at their lower ends to said sill, a member rising from and extending along the foundation adjacent and within said studs, and means supported by said last named member for bracing said wall studs.

23. In a building, a foundation wall, a sill on said wall, a side wall comprising a plurality of upstanding studs comprising oppositely disposed channels secured to said sill at spaced points along said wall, and an upstanding member extended along said wall having an inwardly directed flange, said member being spaced laterally from said side wall and having a bracing connection to said oppositely disposed channels.

24. In a building, a foundation having adjacent angularly related wall portions, sills on said wall portions, a plurality of upstanding studs secured to said sills at spaced points along said foundation, beams extended parallel with one wall portion having ends supported along said adjacent wall on the centers of the studs upstanding therefrom and a bracing connection to said studs, and an upstanding member extending along said one wall parallel with said beams having an inturned flange and a bracing connection to the studs on said last mentioned wall.

25. A building structure comprising a corner stud presenting cooperating connected channels disposed at right angles to each other, wall panels received in the channels of said stud, reenforcing rods overlying the faces of said panels, plate means overlying the upper end of said stud and fixed thereto, plate means underlying said stud and fixed thereto, reenforcing means adjacent said corner stud and between adjacent panel rods and extending between said spaced plate means, external anchoring sheet means extending over said channels and spaced therefrom by said rods and by said reenforcing means adjacent said corner stud, and a cementitious coating over the panels and stud anchored by said sheet means.

26. A prefabricated building wall panel comprising an insulating base board of story height, longitudinally extending panel reenforcing members applied to each face of said board, said reenforcing members being arranged in spaced relation across each face of said board with the members on each face opposite the members on the other face and with the outermost reenforcing members on each vertical edge of said board closer to said vertical edge than the intermediate members are to said outermost members and each other.

27. In a prefabricated building, a wall frame including spaced vertical studs comprising oppositely disposed channel members, panel units assembled therein each comprising a wall board of story height positioned in said frame and having its vertical edges received in said channels, longitudinally extended reenforcing members overlying the outer faces of said panel units and engaging said frame at the ends of said panel units, said reenforcing members being laterally spaced across the face of said panel units with the outermost members of adjacent panel units more closely adjacent the intervening stud than said outermost members are to the next adjacent intermediate reenforcing members, and anchoring sheet means extending over said panel units and the faces of said studs and held in spaced relation to said faces by said outermost reenforcing members.

28. In a prefabricated building, the combination of superposed tiers of panels each carrying vertical reenforcing members which extend beyond the margins thereof, the panels of the lower tier being of story height, and a panel supporting wall frame in which said panels are received including a horizontal intermediate frame member at substantially the ceiling level having parallel horizontal flanges against which the adjacent upper and lower edges of said superposed panels abut and with which said vertical reenforcing members interlock to position the aforesaid adjacent edges of said superposed panels.

29. In a prefabricated building, wall frames including a support, a corner stud thereon presenting cooperating connected channels having their sides disposed at right angles to each other, and plate means fixed to said stud at the upper end of the latter, panels forming adjacent angularly related walls underlying said plate means and having their proximate vertical edges received in said channels, anchoring material spacing means overlying said panels, corner reenforcing rod means on each of said walls adjacent the corner stud, anchoring sheet means extending over said corner stud and the adjacent panels and spaced apart from said walls by said rod means, and a cementitious coating over the panels and stud anchored by said sheet means.

AUSTIN T. LEVY.

CERTIFICATE OF CORRECTION.

Patent No. 2,104,870.            January 11, 1938.

AUSTIN T. LEVY.

It is hereby certified that error appears in the printed specification of the above numbered patent requiring correction as follows: Page 5, second column, line 43, claim 13, strike out the word "receiving"; line 44-45, same claim, strike out "having"; page 6, first column, line 13, claim 17, strike out the words and comma "wall panels in the spaces between the studs,"; line 50, claim 20, after "supporting" strike out the comma and insert the same after "members", same line; and that the said Letters Patent should be read with these corrections therein that the same may conform to the record of the case in the Patent Office.

Signed and sealed this 15th day of March, A. D. 1938.

(Seal)

Henry Van Arsdale,
Acting Commissioner of Patents.

ing wall frame in which said panels are received including a horizontal intermediate frame member at substantially the ceiling level having parallel horizontal flanges against which the adjacent upper and lower edges of said superposed panels abut and with which said vertical reenforcing members interlock to position the aforesaid adjacent edges of said superposed panels.

29. In a prefabricated building, wall frames including a support, a corner stud thereon presenting cooperating connected channels having their sides disposed at right angles to each other, and plate means fixed to said stud at the upper end of the latter, panels forming adjacent angularly related walls underlying said plate means and having their proximate vertical edges received in said channels, anchoring material spacing means overlying said panels, corner reenforcing rod means on each of said walls adjacent the corner stud, anchoring sheet means extending over said corner stud and the adjacent panels and spaced apart from said walls by said rod means, and a cementitious coating over the panels and stud anchored by said sheet means.

AUSTIN T. LEVY.

CERTIFICATE OF CORRECTION.

Patent No. 2,104,870.     January 11, 1938.

AUSTIN T. LEVY.

It is hereby certified that error appears in the printed specification of the above numbered patent requiring correction as follows: Page 5, second column, line 43, claim 13, strike out the word "receiving"; line 44-45, same claim, strike out "having"; page 6, first column, line 13, claim 17, strike out the words and comma "wall panels in the spaces between the studs,"; line 50, claim 20, after "supporting" strike out the comma and insert the same after "members", same line; and that the said Letters Patent should be read with these corrections therein that the same may conform to the record of the case in the Patent Office.

Signed and sealed this 15th day of March, A. D. 1938.

(Seal)
                                Henry Van Arsdale,
                       Acting Commissioner of Patents.

CERTIFICATE OF CORRECTION.

Patent No. 2,104,870.                                January 11, 1938.

AUSTIN T. LEVY.

It is hereby certified that error appears in the printed specification of the above numbered patent requiring correction as follows: Page 5, second column, line 43, claim 13, strike out the word "receiving"; line 44-45, same claim, strike out "having"; page 6, first column, line 13, claim 17, strike out the words and comma "wall panels in the spaces between the studs,"; line 50, claim 20, after "supporting" strike out the comma and insert the same after "members", same line; and that the said Letters Patent should be read with these corrections therein that the same may conform to the record of the case in the Patent Office.

Signed and sealed this 15th day of March, A. D. 1938.

(Seal)                                            Henry Van Arsdale,
                                                      Acting Commissioner of Patents.